Oct. 21, 1958
A. W. NILES
2,856,775
MERCURIAL MANOMETER
Filed Dec. 13, 1955
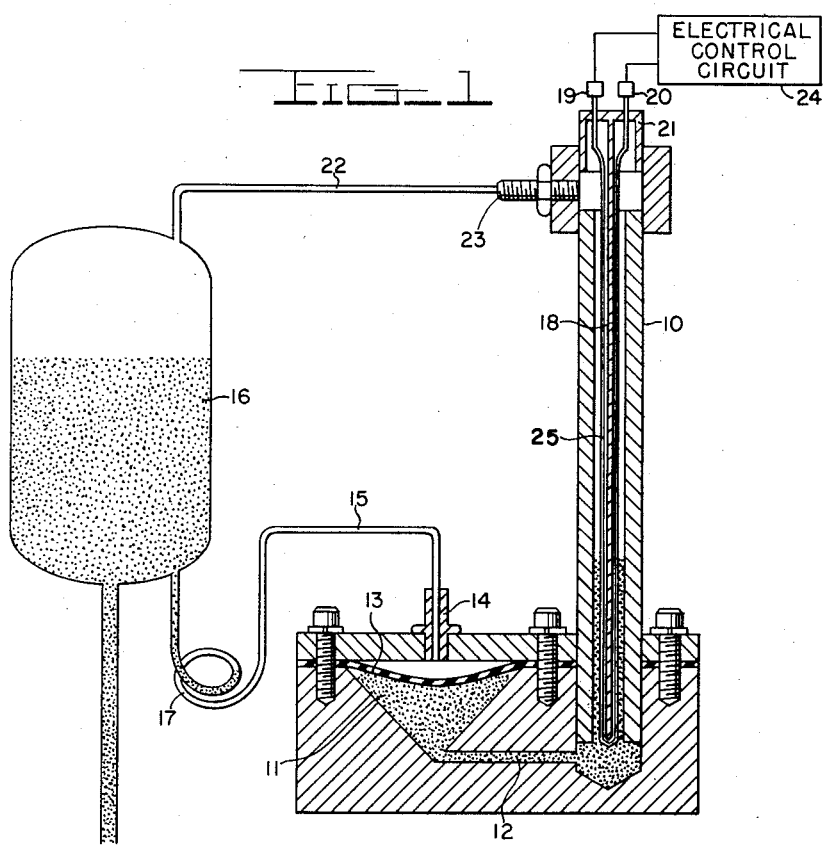
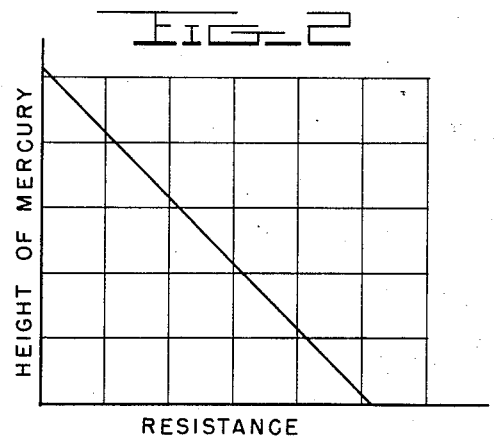
INVENTOR
ALLEN W. NILES
BY *W R Maltby*
ATTORNEYS

United States Patent Office

2,856,775
Patented Oct. 21, 1958

2,856,775

MERCURIAL MANOMETER

Allen W. Niles, Las Cruces, N. Mex., assignor to the United States of America as represented by the Secretary of the Navy Application December 13, 1955, Serial No. 552,955

2 Claims. (Cl. 73—398)

(Granted under Title 35, U. S. Code (1952), sec. 266)

The invention described herein may be manufactured and used by or for the Government of the United States of America for governmental purposes without the payment of any royalties thereon or therefor.

This invention relates in general to mass level sensors and in particular to an improved manometer means for controlling propellant rate of flow in airborne rockets.

High altitude rockets generally employ a fuel and oxidizing agent as their propellant. It is recognized that such rockets attain maximum altitude only when all of the propellant mixture is consumed, and that if no control on the rate of flow is maintained during flight, a significant amount of one propellant ingredient is likely to remain in the rocket after the other propellant ingredient is exhausted. It follows that it is highly desirable to automatically control the mixture of the propellants in such a manner that both ingredients are exhausted simultaneously.

Accordingly:

It is an object of this invention to provide a pressure sensitive control means for use in airborne rockets.

It is another object of this invention to provide a variable impedance manometer wherein the impedance is continuously proportional to the height of the mercurial column.

It is still another object of this invention to provide a pressure sensitive control means for use in airborne rockets which is relatively unaffected by positive acceleration of the rocket.

It is an additional object of this invention to provide a light weight, compact, and simple to install, pressure sensitive control means for use in airborne rockets.

Other objects of this invention will become apparent upon a more comprehensive understanding of the invention for which reference is had to the accompanying specification and drawings.

Wherein:

Fig. 1 is a pictorial cutaway showing of one embodiment of the invention.

Fig. 2 is a graphical showing of output impedance plotted against the height of the mercurial column for the embodiment of Fig. 1.

Briefly, the device of this invention provides a pressure sensitive electrical means for indicating by a proportionate impedance the amount of liquid propellant in the supply tank of a rocket. The output impedance of the device of this inventon may be employed in conjunction with conventional means to regulate any desired function in the rocket. In the particular embodiment shown in the drawings, the device of this invention may be employed together with a twin device, to control the mixture of a two ingredient liquid propellant into the combustion chamber of the rocket engine. Compared with present known pressure sensitive devices for producing an impedance proportional to pressure or volume, the device of this invention is relatively lightweight and extremely accurate in its output control function. Accuracy is particularly enhanced by the continuous nature of the control which this invention affords. In addition, by its balanced pressure operation, the device of this invention is inherently unaffected by the positive acceleration of the airborne rocket.

Referring now to the drawings:

Fig. 1 depicts a typical manometer sensor adapted in accordance with the teaching of the present invention. The manometer comprises a fluid containing erect tubular structure 10 and a fluid containing open ended well structure 11 connected by a channel 12 such that the fluid level in the tubular structure 10 is proportional to the fluid pressure in the well structure 11. In the exemplary embodiment the above said fluid is mercury. It is understood, of course, that any conductive involatile fluid might be substituted for the mercury fluid in this invention. A resilient pressure diaphragm 13 is stretched across the top of the well 11. The material employed for the diaphragm 13 is impervious to both the fluid in the well structure and the pressure quantity to be measured. Thus the diaphragm 13 acts to isolate the fluid in the well structure and the pressure quantity to be measured, either liquid or gas, and at the same time transposes any pressure variation in the quantity to be measured to the mercury in the well structure 11. An opening 14 above the diaphragm 13 is connected by a tube 15 to the pressure quantity to be measured, in this instance, liquid oxygen. In the depicted embodiment the tube 15 is connected to a tank 16 which contains the liquid oxygen. As indicated in the drawing the tube 15 includes a boil-off coil section 17 which permits the liquid oxygen in the tank 16 to evaporate to a gas which, in turn, transmits the pressure to the sensor. In this embodiment the coil 17 protects the sensor from the low temperature of the liquid oxygen and the low density gas column allows location of the sensor at any level in the rocket. It is understood, of course, that the boil-off coil section is not essential to every embodiment of this invention and might be eliminated, for example, where the temperature of the quantity to be measured is not an important consideration.

In accordance with the invention, a resistance wire 25 is bent back upon itself in U-shaped fashion on a support member 18 to form two equal half sections. This resistance wire is then vertically extended within the bore of the erect tubular structure with the two terminal ends 19 and 20 of the resistance wire 25 protruding through the pressure seal 21 at the top end of said tubular structure. Since the mercury in the manometer is conductive it will be seen that the portion of the resistance wire 25 beneath the surface of the mercury will be effectively shorted-out. Thus, as the height of the mercury varies, a varying portion of the wire 25 is shorted and the magnitude of resistance measured at the terminals 19 and 20 is a measure of the mercury height. While the resistance wire is specifically described herein as U-shaped, it is readily apparent that the only essential requirement is that the wire be configured and disposed within the tubular structure such that the wire may be variably immersed in the conductive fluid in accordance with variation in the height of the fluid.

To control the propellant mixture in this exemplary embodiment, the two terminals 19 and 20 are connected to an electrical control circuit indicated in block diagram at 24. It will be seen that the variation in resistance magnitude at the terminals 19 and 20 might be utilized in a variety of electrical control circuits. For example, the resistance wire might be incorporated in one of the legs of a balanced resistance bridge and the mid-point difference in potential employed to operate a conventional fluid mixing valve. Otherwise, the resistance wire might be connected in series with a voltage source and the voltage output, which varies in accordance with the voltage drop across the resistance wire, employed to operate the conventional fluid mixing valve.

It is important in this invention that the manometer and the mercury therein be kept perfectly clean. Particular care must also be taken to insure the cleanness of the resistance wire since cleanliness affects the mercury to metal adherence and the accuracy of the device is critically dependent upon sharpness of the break between the surface of the mercury and the resistance wire.

The resistance wire contemplated in the exemplary embodiment is exceedingly small, for example, 0.0009 inch diameter, and special care must be exercised in the cleaning process required before the resistance wire is inserted within the manometer. One suitable method of cleaning is to run the wire through an acid bath (10% nitric acid, 2% hydrofluoric acid) and distilled water rinse at 6 inches per minute. The wire may be dried in a desiccator. Following the cleaning operation, care must then be taken to avoid subsequent contamination of the wire due to handling or breathing upon it.

The device of this invention may be calibrated against a standard mercury manometer by connecting both pressure sensitive devices to a differential source. Fig. 2 is a graphical showing of the output impedance of the device of this invention plotted against the corresponding calibrated height of the column in a standard mercury manometer.

In order to transmit tank gas pressure to the sensor, narrow tubing 22 having an inside diameter of, for example, 0.18 inch, connects the top of the tank 16 and an opening 23 at the top of the tubular structure 10. By its small inner dimension, this tubing substantially precludes oscillations being set-up in the line due to any irregular positive acceleration of the rocket.

It will be seen that by its continuous reliable indication of the amount of the propellant remaining in a rocket, a continuous control may be maintained on the propellant mixture and a continuous accurate record of propellant dissipation may be transmitted by telemetering procedure to the ground station as the rocket ascends. Thus not only is the optimum altitude attainable but continuous information regarding the rocket's propellant dissipation is available which affords an invaluable aid in analysis of the rocket's progression.

While the particular embodiment exemplarily shown in Fig. 1 is highly suitable for use in airborne rockets, it is understood, of course, that the device of this invention is also advantageous in the measurement of a pressure quantity in other circumstances as well. Finally, it is understood that the invention is to be limited only by the scope of the claims appended hereto.

What is claimed is:

1. A pressure sensitive control device for determining the gravitational pressure of a liquid fluid in a storage tank comprising a tubular column; a reservoir of predetermined internal capacity; said reservoir having at least one variable dimension such that the internal capacity of the reservoir may be altered within selected limits of maximum and minimum; a conductive involatile fluid contained in said reservoir of sufficient amount to fill said reservoir in its maximum capacity condition; means interconnecting said reservoir and the bottom end of said column such that the overflow of said conductive fluid from said reservoir, which occurs when the internal capacity of said reservoir is reduced, will enter said column and attain a level therein in proportion to the alteration of the internal capacity of said reservoir; said conductive fluid being adapted to flow into said column as the internal capacity of the reservoir is reduced; a resistance wire means disposed within said column and extending the length thereof such that the rising of said conductive fluid in said column will effectively short out a portion of said wire in proportion to the alteration of the internal capacity of said reservoir; impedance sensitive control means; the ends of said wire being connected to said control means such that said control means is operative in response to and in accordance with overall impedance variations in said wire; means connecting the bottom portion of said storage tank to said reservoir such that the gravitational pressure of the fluid in said tank acts upon said variable dimension of said reservoir to vary the internal capacity of said reservoir in accordance therewith, and pressure equalizing means interconnecting the top portion of said storage tank and the top portion of said column and adapted to gradually equalize pressures therebetween.

2. A pressure sensitive control device for determining the gravitational pressure of a liquid fluid stored at low temperature in a storage tank comprising a tubular column; a reservoir having at least one variable dimension such that the internal capacity of the reservoir may be altered within selected limits of maximum and minimum; a conductive involatile fluid contained in said reservoir of sufficient amount to fill said reservoir in its maximum capacity condition; means interconnecting said reservoir and the bottom end of said column such that the overflow of said conductive fluid from said reservoir, which occurs when the internal capacity of said reservoir is reduced, will enter said column and attain a level therein in proportion to the alteration of the internal capacity of said reservoir; said conductive fluid being adapted to flow into said column as the internal capacity of the reservoir is reduced; a resistance wire means disposed within said column and extending the length thereof such that the rising of said conductive fluid in said column will effectively short out a portion of said wire in proportion to the alteration of the internal capacity of said reservoir; impedance sensitive control means; the ends of said wire being connected to said control means such that said control means is operative in response to and in accordance with overall impedance variations in said wire; means connecting the bottom portion of said storage tank to said reservoir such that the gravitational pressure of the fluid in said tank acts upon said variable dimension of said reservoir to vary the internal capacity of said reservoir in accordance therewith; said means connecting the bottom portion of said storage tank to said reservoir including gaseous means for temperature insulation of said liquid fluid from said reservoir; and pressure equalizing means interconnecting the top portion of said storage tank and the top portion of said column and adapted to gradually equalize pressures therebetween.

References Cited in the file of this patent

UNITED STATES PATENTS

| | | |
|---|---|---|
| 1,172,650 | Walton | Feb. 22, 1916 |
| 2,398,375 | Heenan | Apr. 16, 1946 |
| 2,571,124 | Farrand | Oct. 16, 1951 |

FOREIGN PATENTS

| | | |
|---|---|---|
| 217,193 | Great Britain | Feb. 26, 1925 |
| 1,014,130 | France | Aug. 11, 1952 |